(12) United States Patent
Novak et al.

(10) Patent No.: US 8,880,667 B2
(45) Date of Patent: Nov. 4, 2014

(54) SELF REGULATION OF THE SUBJECT OF ATTESTATION

(75) Inventors: Mark F. Novak, Newcastle, WA (US); Stefan Thom, Snohomish, WA (US); Yair Tor, Shorashim (IL); Alexey Efron, Haifa (IL); Amos Ortal, Kfar Yona (IL)

(73) Assignee: Microsoft Corporation, Redmond, WA (US)

( * ) Notice: Subject to any disclaimer, the term of this patent is extended or adjusted under 35 U.S.C. 154(b) by 434 days.

(21) Appl. No.: 13/024,288

(22) Filed: Feb. 9, 2011

(65) Prior Publication Data

US 2012/0204020 A1    Aug. 9, 2012

(51) Int. Cl.
| | | |
|---|---|---|
| *G06F 15/173* | (2006.01) | |
| *H04L 29/06* | (2006.01) | |
| *G06F 21/64* | (2013.01) | |
| *G06F 21/57* | (2013.01) | |

(52) U.S. Cl.
CPC ............ *H04L 63/1433* (2013.01); *H04L 63/20* (2013.01); *G06F 21/64* (2013.01); *G06F 21/575* (2013.01)
USPC ........... 709/223; 709/224; 709/225; 713/155; 713/156

(58) Field of Classification Search
USPC ......... 713/155, 159, 161, 168–170, 176–179; 705/67; 726/1–36; 380/258
See application file for complete search history.

(56) References Cited

U.S. PATENT DOCUMENTS

| | | | |
|---|---|---|---|
| 5,721,781 A | 2/1998 | Deo et al. | |
| 6,006,332 A | 12/1999 | Rabne et al. | |
| 6,327,652 B1 | 12/2001 | England et al. | |
| 6,330,670 B1 | 12/2001 | England et al. | |
| 6,766,314 B2 | 7/2004 | Burnett | |
| 7,024,695 B1 * | 4/2006 | Kumar et al. | 726/26 |
| 7,069,330 B1 | 6/2006 | McArdle et al. | |
| 7,089,594 B2 | 8/2006 | Lal et al. | |
| 7,143,288 B2 | 11/2006 | Pham et al. | |
| 7,210,039 B2 | 4/2007 | Rodgers et al. | |
| 7,213,266 B1 | 5/2007 | Maher et al. | |
| 7,296,296 B2 | 11/2007 | Dunbar et al. | |
| 7,404,086 B2 | 7/2008 | Sands et al. | |

(Continued)

FOREIGN PATENT DOCUMENTS

CN    101132300 A    2/2008

OTHER PUBLICATIONS

Sushil Jajodia, Malware Detection, Springer, 2007, Section 6.1-6.2.*

(Continued)

*Primary Examiner* — Farid Homayounmehr
*Assistant Examiner* — Lizbeth Torres-Diaz
(74) *Attorney, Agent, or Firm* — Ben Tabor; Raghu Chinagudabha; Micky Minhas (57) ABSTRACT

Attestation by a self-regulating attestation client. The attestation client requests a credential of health from an attestation service, which includes an ordered attestation log and proof of integrity and freshness of the log. The attestation client receives the requested credential of health, which certifies the attestation client was healthy when it requested the credential of health and that the attestation service trusts the attestation client to be healthy each time the attestation client authenticates using the credential of health. The attestation client receives a request to authenticate that it is healthy using the credential of health, verifies that it is currently healthy, and performs the requested authentication.

22 Claims, 5 Drawing Sheets

(56) References Cited

U.S. PATENT DOCUMENTS

| | | |
|---|---|---|
| 7,509,685 B2 | 3/2009 | Lambert |
| 7,587,607 B2 | 9/2009 | Brickell et al. |
| 7,739,402 B2 | 6/2010 | Roese et al. |
| 7,930,733 B1 | 4/2011 | Iftode et al. |
| 2002/0049679 A1 | 4/2002 | Russel |
| 2003/0217011 A1 | 11/2003 | Peinado et al. |
| 2003/0221002 A1* | 11/2003 | Srivastava et al. ............ 709/224 |
| 2004/0003139 A1 | 1/2004 | Cottrille et al. |
| 2004/0088536 A1 | 5/2004 | Lim et al. |
| 2004/0151315 A1 | 8/2004 | Kim |
| 2005/0033987 A1 | 2/2005 | Yan et al. |
| 2005/0060568 A1 | 3/2005 | Beresnevichiene et al. |
| 2005/0080746 A1 | 4/2005 | Zhu |
| 2005/0120219 A1* | 6/2005 | Munetoh et al. ............. 713/176 |
| 2005/0125548 A1 | 6/2005 | England et al. |
| 2005/0182944 A1* | 8/2005 | Wagner et al. ................ 713/182 |
| 2005/0210266 A1* | 9/2005 | Cottrell et al. ................ 713/185 |
| 2005/0216745 A1 | 9/2005 | Speare et al. |
| 2005/0246767 A1* | 11/2005 | Fazal et al. ...................... 726/11 |
| 2005/0251857 A1 | 11/2005 | Schunter et al. |
| 2005/0257271 A1 | 11/2005 | Lafornara |
| 2006/0059555 A1* | 3/2006 | Holladay et al. ................ 726/22 |
| 2006/0059569 A1 | 3/2006 | Dasgupta et al. |
| 2006/0095965 A1* | 5/2006 | Phillips et al. ................. 726/22 |
| 2006/0184802 A1 | 8/2006 | Ibrahim et al. |
| 2006/0253894 A1 | 11/2006 | Bookman et al. |
| 2006/0265464 A1 | 11/2006 | Nassiri |
| 2007/0113079 A1 | 5/2007 | Ito et al. |
| 2007/0168665 A1 | 7/2007 | Kim et al. |
| 2007/0179802 A1 | 8/2007 | Buss et al. |
| 2007/0192864 A1 | 8/2007 | Bryant et al. |
| 2007/0219917 A1 | 9/2007 | Liu et al. |
| 2007/0278296 A1* | 12/2007 | Dwyre et al. ................. 235/380 |
| 2008/0028436 A1 | 1/2008 | Hannel et al. |
| 2008/0052395 A1 | 2/2008 | Wright et al. |
| 2008/0059804 A1 | 3/2008 | Shah et al. |
| 2008/0060083 A1 | 3/2008 | Koved |
| 2008/0134046 A1* | 6/2008 | Gray et al. .................... 715/736 |
| 2008/0270603 A1 | 10/2008 | Berger et al. |
| 2009/0006868 A1 | 1/2009 | Alkove et al. |
| 2009/0064292 A1 | 3/2009 | Carter et al. |
| 2009/0150968 A1* | 6/2009 | Ozzie et al. ........................ 726/1 |
| 2009/0151006 A1 | 6/2009 | Saeki et al. |
| 2009/0204964 A1* | 8/2009 | Foley et al. ....................... 718/1 |
| 2009/0271618 A1 | 10/2009 | Camenisch et al. |
| 2009/0327705 A1 | 12/2009 | Ray et al. |
| 2009/0328134 A1 | 12/2009 | Ray et al. |
| 2010/0023743 A1 | 1/2010 | Sastry et al. |
| 2010/0031047 A1 | 2/2010 | Coker, II et al. |
| 2010/0082984 A1* | 4/2010 | Ellison et al. ................. 713/170 |
| 2010/0281273 A1* | 11/2010 | Lee et al. ....................... 713/190 |
| 2011/0215921 A1* | 9/2011 | Ben Ayed et al. ........ 340/539.11 |

OTHER PUBLICATIONS

Wenjuan Xu et al, "Building Dynamic Remote Attestation Framework", Pub. Date: 2009, (3 pages).

Tamleek Ali, et al, "Incorporating Remote Attestation for End-to-End Protection in Web Communication Paradigm", Pub. Date: Sep. 2009, (10 pages).

Krishnan et al., "PEI Models for Scalable, Usable and High-Assurance Information Sharing", ACM, New York, NY, 2007. (The month of Publication is irrelevant since the year of Publication is clearly prior to the filing of the Application).

Seth Schoen, "Trusted Computing: Promise and Risk", Oct. 2003.

Roder et al., "Hades—Hardware Assisted Document Security", Darmstadt University of Technology, Darmstadt, Germany, WATC, Tokyo, Nov. 30, 2006.

Thomboroson et al., "Governance of Trusted Computing", University of Auckland, Auckland, NZ, Oct. 2006.

Microsoft, "Access Policy Management: Authorizing for Access", Dec. 2005, 20 pages.

IBM Internet Security Systems Market Brief, "How to take the fear out of bringing government systems online", 2007, 11 pages. (The month of Publication is irrelevant since the year of Publication is clearly prior to the filing of the Application).

Entrust Securing Digital Identities & Information, "Entrust Entelligence Group Share", 2007, 2 pages. (The month of Publication is irrelevant since the year of Publication is clearly prior to the filing of the Application).

U.S. Appl. No. 12/163,426, May 17, 2011, Office Action.
U.S. Appl. No. 12/163,426, Oct. 17, 2011, Office Action.
U.S. Appl. No. 12/163,426, Jun. 13, 2012, Office Action.
U.S. Appl. No. 12/163,426, Oct. 19, 2012, Notice of Allowance.
U.S. Appl. No. 12/163,548, Mar. 3, 2011, Office Action.
U.S. Appl. No. 12/163,548, Oct. 17, 2011, Office Action.
U.S. Appl. No. 12/163,548, Mar. 19, 2012, Notice of Allowance.

* cited by examiner

SELF REGULATION OF THE SUBJECT OF ATTESTATION

BACKGROUND

Malware, or malicious software (e.g. viruses, worms, trojan horses, spyware, rootkits, etc.), remains a significant problem in computing. Malware is generally executed on a computing system without informed user consent, and places the computing system in an unhealthy or unknown state when present. Once compromised by malware, the computing system cannot be trusted by itself or by other computing systems to behave as expected. Furthermore, some software executing at a computing system, while not malware, can behave in undefined or unauthorized ways (e.g. through bugs or design flaws) which can also place the computing system in an unhealthy or unknown state.

Trusted Computing technology helps address the problem of determining whether a computing system can be trusted. Trusted Computing technology provides remote attestation services that validate the health of an attestation client, which is the subject of attestation. Under this model, the attestation client keeps a log of all relevant system events in a log, such as an ordered Trusted Computing Group (TCG) log. For added security, the log can be made tamper resistant (e.g. by being ordered or sequential), and the integrity of the log can be verifiable by the attestation services.

When attestation is requested, the attestation client sends the entire log to an attestation service, which examines the log and determines the health of the attestation client. For instance, the attestation service can validate whether only authorized or trusted code was running at the attestation client when the log was sent. If the log passes validation by the attestation service, then the attestation service attests that the attestation client can be trusted to have been in a healthy state at the time that the attestation client sent the log to the attestation service. This trust information can be shared with the attestation client, shared with relying parties (such as third parties), and/or used by the attestation service itself.

BRIEF SUMMARY

In one implementation described herein, an attestation client performs remote attestation with an attestation service. Further, the attestation client performs self-regulation that is trusted by the attestation service. The attestation service issues a credential of health that certifies that the attestation client was healthy at the time of attestation, and that the attestation client is trusted to use the credential of health in a prescribed manner.

For example, at least one embodiment described herein relates to a self-regulating attestation client that requests a credential of health from an attestation service. The request includes an ordered attestation log and proof of integrity and freshness of the log. Subsequently, the attestation client receives the requested credential of health, which represents a certification on the part of the attestation service that the attestation client was healthy when it requested the credential of health and that the attestation service trusts the attestation client to be healthy each time the attestation client authenticates using the credential of health. The attestation client later receives a request to authenticate that it is healthy using the credential of health, verifies that it is currently healthy, and performs the requested authentication.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In one implementation described herein, an attestation client performs remote attestation with an attestation service. Further, the attestation client performs self-regulation that is trusted by the attestation service. The attestation service issues a credential of health that certifies that the attestation client was healthy at the time of attestation, and that the attestation client is trusted to use the credential of health in a prescribed manner.

First, some introductory discussion regarding computing systems will be described with respect to FIG. 1. Then, the embodiments of self-regulated attestation will be described with respect to subsequent figures.

Figure 1:
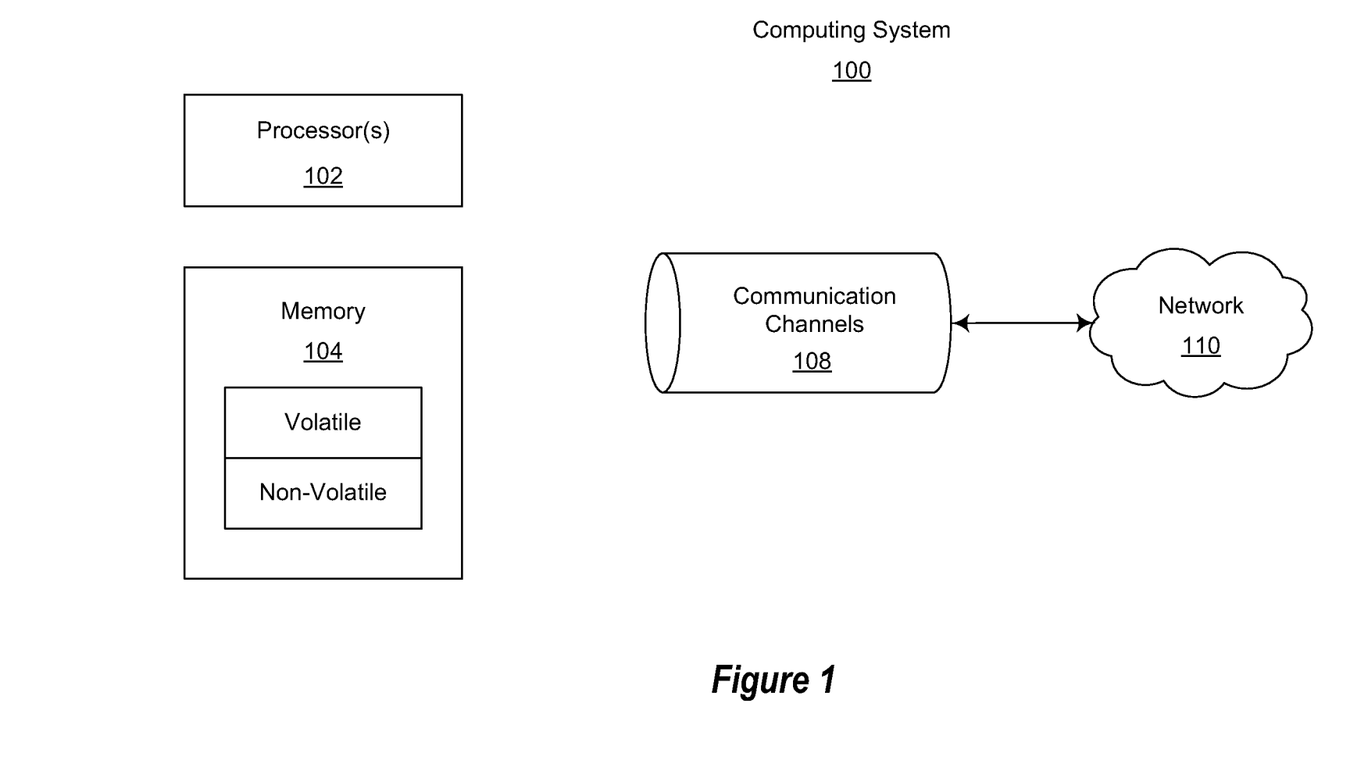
FIG. 1 illustrates an example computing system that may be used to employ embodiments described herein.

Introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, tablet computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
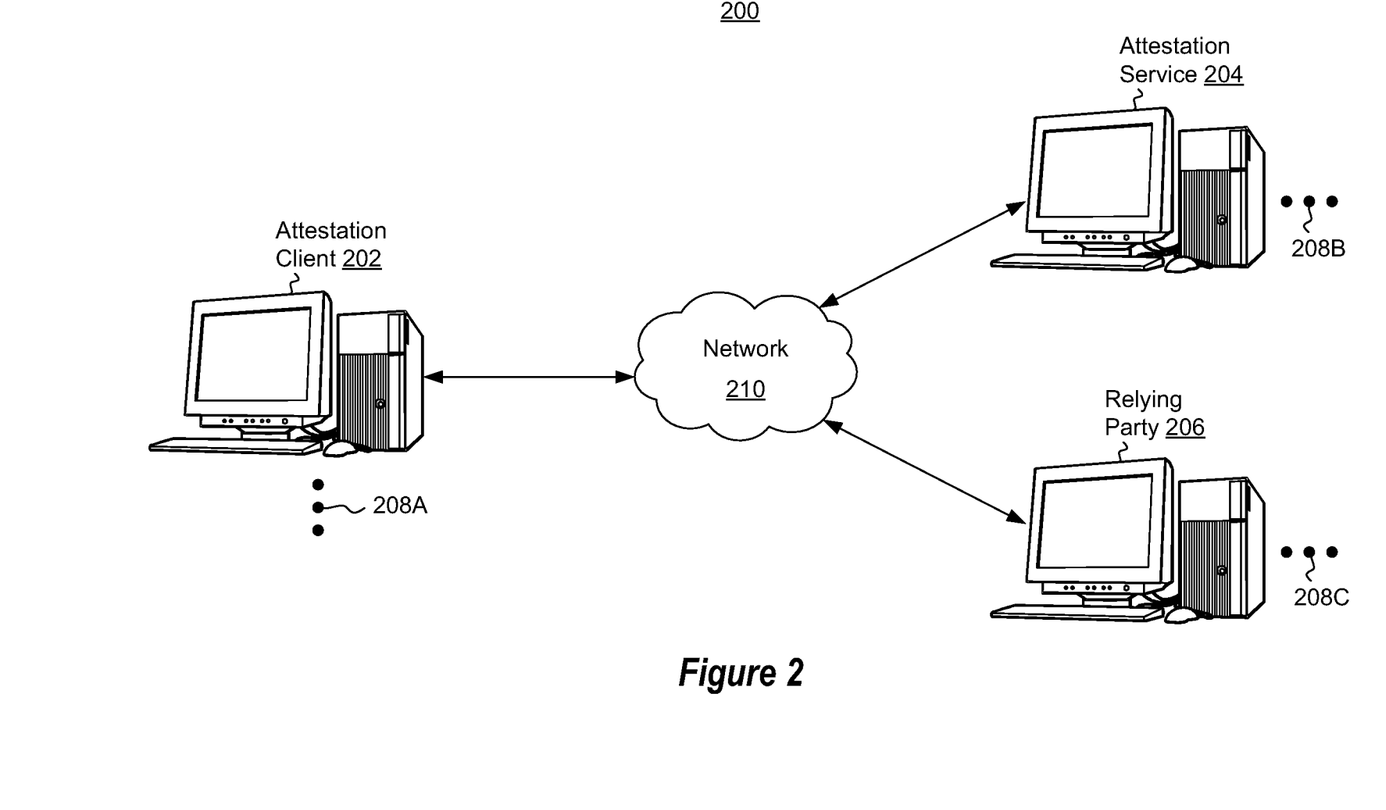
FIG. 2 illustrates an attestation system for performing self-regulating attestation.

Initially, a brief overview of self-regulating attestation in accordance with embodiments of the present invention is presented with reference to FIG. 2. Then, a more detailed description a self-regulating/self-policing attestation client will be discussed with reference to FIG. 3. Finally, exemplary acts performed at self-regulating attestation clients and attestation services will be discussed with reference to FIGS. 4 and 5.

FIG. 2 illustrates an attestation system for performing self-regulating attestation. The attestation system 200 includes at least one self-regulating attestation client 202 and at least one attestation service 204. The attestation system 200 may also include relying party 206. The ellipses 208A represents that there may be any number of self-regulating attestation clients 202 in the attestation system 200. The ellipses 208B represents that there may be any number of attestation services 204 in the attestation system 200. The ellipses 208C represents that there may be any number of relying parties 206 in the attestation system 200. The attestation clients 202, attestation services 204 and relying parties 206 can all be communicatively connected via network 210 or by any other appropriate communication means.

To begin self-regulating attestation, attestation client 202 requests a credential of health from attestation service 204 over network 210, and attestation service 204 receives the request. A "request," as used herein, can be a single request, or can include a plurality of communications between two parties, such as attestation client 202 and attestation service 204. For instance, a "request" may comprise a handshake that involves one or more requests and/or replies between two parties (e.g. attestation client 202 and attestation service 204). Whether communicated with the initial request, or communicated as part of a handshake, the present request for a credential of health includes attestation client 202 communicating an ordered (or sequential) attestation log and a proof of integrity and freshness of the ordered attestation log to attestation service 204.

The ordered attestation log is resistant to tampering (e.g. the removal or modification of past entries). In some embodiments, the attestation log comprises a Trusted Computing Group (TCG) log. Whatever form the attestation log takes, the attestation log includes entries for all relevant attestation-related events that transpired on attestation client 202 from the time the client was powered on to the time the attestation log was sent to attestation service 204. For instance, the attestation log can include information about all (or substantially all) of the running software components at attestation client 202. This information may include, for instance, a sequential log of all binaries loaded at attestation client 202, as well as any associated configuration.

Attestation service 204 verifies the integrity and freshness of the attestation log using the proof of integrity and freshness, and uses the information in the attestation log to verify that attestation client 202 was healthy at the moment attestation client 202 sent the attestation log to attestation service 204. This verification includes verifying that attestation client 202 is only running trusted software components in a trustworthy configuration. Stated differently, attestation service 204 uses the attestation log to verify that attestation client 202 was not running malware or other untrusted code, and that attestation client 202 was not otherwise in a vulnerable state, when it requested the credential of health, among other things.

Furthermore, the information in the attestation log is used by attestation service 204 to verify that attestation client 202 can be trusted to defend itself against attacks and to only use the credential of health when the attestation client 202 is healthy or "within policy." In other words, attestation service 204 verifies that it can trust attestation client 202 to discard any issued credential of health (or to deny itself access thereto) if the attestation client 202 ever becomes unhealthy or falls "out of policy." As discussed more fully later, the attestation log includes information about monitoring agents and security policies used by attestation client 202. This information is used by attestation service 204 as part of the foregoing verification to verify that attestation client 202 is a self-regulating client that actively defends itself against malware and other untrusted code and that attestation client 202 would only use the credential of health (if issued) in a trusted manner defined by the security policies.

If attestation service 204 verifies both the past health of attestation client 202 as well as and the present and future ability of attestation client 202 to self-regulate its health and its use of the credential of health in a trusted manner, attestation service 204 generates a credential of health that uniquely identifies and is only usable by attestation client 202. The credential of health certifies both that attestation client 202 was healthy when it requested the certificate of health and that attestation service 204 trusts attestation client 202 to be healthy each time attestation client 202 authenticates using the credential of health so long as the credential of health is valid. Notably, the credential of health includes an expiration time, after which the credential of health is no longer valid. After expiration of the credential of health, attestation client 202 will need to request a new credential of health in order to be trusted again by attestation service 204. Attestation service 204 sends the generated credential of health to attestation client 202, and attestation client 202 receives the credential of health.

Subsequently, attestation client 202 receives a request to use the credential of health to authenticate that it is currently healthy. For example, attestation client 202 can receive a request from relying party 206. Of course, one will recognize that relying party 206 and attestation service 204 may be one in the same. One will also recognize that relying party 206 and attestation client 202 may also be one in the same, in that relying party 206 may be a component running concurrently with an attestation client 202 component at a single computing system. Thus, receiving a request can comprise receiving a request from attestation service 204 or a separate relying party 206 over network 210 (or any other appropriate communications mechanism). Furthermore, receiving a request can comprise receiving a local request. In response to the request, attestation client 202 verifies its own state of health and, if healthy, attestation client 202 uses the credential of health to authenticate that it is currently healthy or "within policy."

Notably, classic remote attestation services only verify and attest to the past health of an attestation client. These classic services lack the ability verify that an attestation client is self-regulating or self-policing, which enables the attestation service to also attest to the present or future health of an attestation client during the validity period of the credential of health. Furthermore, classic attestation clients lack the ability to self-regulate or self-police and to provide self-attestation capabilities, which can be relied upon by attestation services and relying parties. The abilities of an attestation client to self-regulate/self-police and to provide self-attestation greatly increases the trust that can be placed in the attestation client, because attestation services can attest to current and future health of the attestation client, instead of just past health. Furthermore, these abilities greatly reduce the cost of attestation, because, after initial attestation, the attestation client can, itself, attest to its own health without further involving the attestation service, at least until the credential of health expires.

Furthermore, classic attestation logs grow unbounded as attestation-related events occur during the runtime of the subject of attestation. One will appreciate that unbounded log growth also leads to unbounded resource utilization, including unbounded consumption of memory and/or storage resources (both at attestation clients and at attestation services), unbounded network bandwidth usage (as the log is sent to attestation services), and unbounded use of processing resources (both at attestation clients and at attestation services). As discussed in more detail with reference to FIG. 3, the disclosed self-regulating and self-attesting mechanisms create a bounded attestation log, which alleviates the problem of unbounded resource use.

Figure 3:
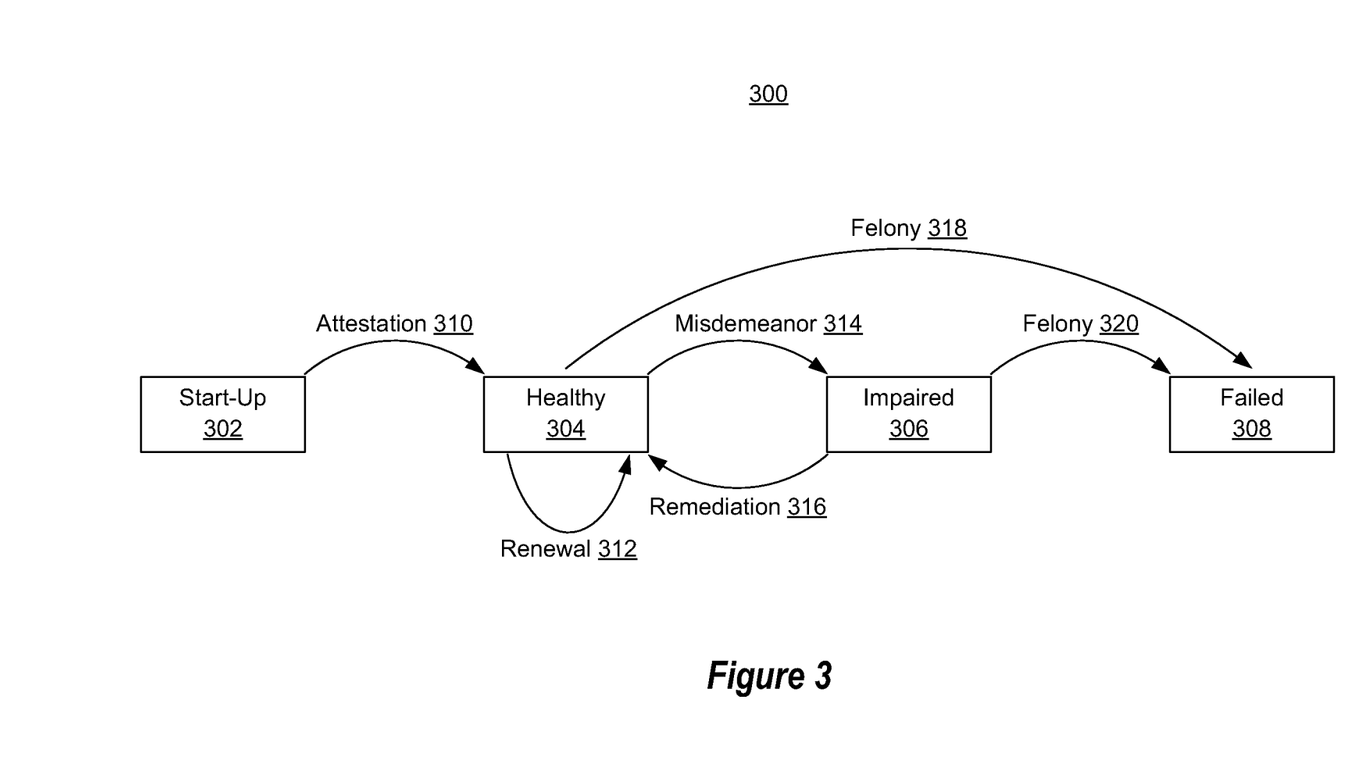
FIG. 3 illustrates a is a flowchart of a state diagram for a self-regulating attestation client.

Turning now to FIG. 3, illustrated is a flowchart of a state diagram 300 for a self-regulating attestation client, such as attestation client 202. After the attestation client is powered on, the attestation client enters a start-up state 302 in which the attestation client performs a measured boot sequence. During the measured boot sequence, the attestation client loads one or more trusted boot time components and records attestation-related events of the measured boot sequence in the attestation log. The recorded information can include, for example, the identity of the trusted boot time components that were loaded, along with their corresponding configuration. The trusted boot-time components can include any appropriate trusted boot-time components, such as trusted hardware drivers (e.g. signed firmware), trusted operating system components, trusted security components, etc. Events recorded in the attestation log can be used by an attestation service (e.g. attestation service 204) to verify whether the attestation client was in a healthy state after the measured boot.

Furthermore, prior to loading any other third-party or untrusted code, the attestation client loads one or more trusted monitoring agents. The trusted monitoring agents can comprise, for example, one or more anti-malware agents and/or one or more attestation agents. Of course, anti-malware agents and attestation agents can also be combined into a single unit. The trusted monitoring agents can be provided by an operating system vendor, a security vendor and/or a trusted third party, such as an anti-malware company (e.g. McAfee, Inc., Symantec Corporation, etc.). Regardless of their specific configuration, the trusted monitoring agents remain resident for the duration of the attestation client's runtime and are used for self-regulation or self-policing. This includes defending the attestation client locally by actively defending against malware and untrusted code, and by enforcing one or more attestation-related security policies. Information about the one or more trusted monitoring agents and the one or more security policies are also recorded in the attestation log.

The attestation client performs an attestation event 310 with an attestation service in the manner described previously, and arrives at a healthy state 304 after receiving a credential of health. As discussed, attestation event 310 includes the attestation client sending the attestation log to the attestation service, along with proof of integrity and freshness of the attestation log, and the attestation service verifies the integrity and freshness of the attestation log. For example, verifying integrity of the attestation log can include protecting against replay attacks. As part of the request, the attestation service can send the client a unique identifier, such as a cryptographic "number used once" (nonce). Then, when the attestation client sends the attestation log to the attestation service, the proof of integrity of the attestation log can include a signature over the contents of the attestation log, along with the nonce. Since a nonce, by definition, is only used once, this provides the desired property of ensuring that the communication cannot be replayed. Additionally, verifying freshness of the attestation log can include the attestation service verifying that the attestation log reflects the current state of the attestation client, and not some previous state.

Once verified, the attestation log is used by the attestation service to verify that the attestation client was healthy at the time the attestation log was sent, including verifying that the attestation client was healthy after the measured boot sequence. The attestation log is also used by the attestation service to verify the configuration of the one or more trusted monitoring agents and the one or more security policies, and to verify that the attestation client can be trusted, through the monitoring agents and security policies, to perform self-regulation and self-attestation in a trusted manner. That is, the attestation service verifies that it can trust the attestation client to police and defend itself to maintain a healthy state and to authenticate that it is healthy only when it is actually healthy and "within policy." If all verifications pass, the attestation service generates a credential of health that is specific to the attestation client and that can only be used by the attestation client during the validity period of the credential of health.

Generating a credential of health can include generating a cryptographic digital certificate or token (e.g, an X.509 certificate, a Security Assertion Markup Language (SAML) token, etc.) and signing that certificate or token with a public cryptographic key provided by the attestation client. For instance, the attestation client can generate, either during boot or at another time, the public cryptographic key along with a private cryptographic key. Once signed by the attestation client's public cryptographic key, the credential of health can only be used to authenticate the attestation client's health when used in connection with the attestation client's private cryptographic key. Thus, based on conditions specified in the security policies, the attestation client can refuse to attest to its health by voluntarily refusing to authenticate with the private cryptographic key or by relinquishing access to the private cryptographic key altogether. In some embodiments, the private cryptographic key is stored in a trusted hardware component at the attestation client such that, once access to the trusted hardware component has been relinquished by the attestation client, access to the private cryptographic key can only be regained through a reboot and re-attestation. One will appreciate, then, that by relinquishing access to the private cryptographic key the attestation client has effectively discarded the credential of health.

In some embodiments, the trusted hardware component comprises a Trusted Platform Module (TPM) that provides secure cryptographic functions including generation of cryptographic keys, pseudo-random number generation, sealed/protected storage, measurement facilities, authentication of hardware devices, and the like. Thus, generation of the public and private cryptographic keys can include the TPM generating the keys, storing the keys can include the TPM storing the keys, and relinquishing access to the private cryptographic key can include relinquishing access to keys stored in the TPM.

Notably, once the attestation client has performed the initial attestation event 310, the number of attestation-related events recorded in the attestation log can be greatly reduced, because the attestation client performs self-regulation and self-attestation (using the credential of health), instead of relying entirely on the attestation service to attest to its health. Thus, the size of the attestation log can be fixed, or its expansion rate can be significantly reduced as compared to classic modes of attestation, thereby solving the problem of unbounded resource use, discussed previously. Of course, the attestation client may still occasionally perform attestation events with attestation services, such as through a renewal event 312. Renewal events may, for example, be performed when a credential of health has expired or is about to expire.

When in the healthy state 304, the attestation client uses the trusted monitoring agents to perform self-regulation to ensure that the attestation client either stays "within policy" or relinquishes access to its private cryptographic key. Security policies can include rules about third party applications that can run at the attestation client, events that would remove the attestation client from the healthy state 304, events that would restore the attestation client to the healthy state, and the like. When in the healthy state 304 (i.e., when the attestation client is "within policy"), the attestation client responds favorably to requests to use the credential of health to authenticate that it is healthy. For example, if a relying party (e.g., relying party 206) requests authentication, the attestation client verifies that it is in the healthy state 304 and authenticates or attests to its health using the credential of health and the private cryptographic key.

The attestation client can leave the healthy state 304 for any number of reasons. For example, misdemeanor events 314 can cause the attestation client to temporarily leave the healthy state 304 and enter an impaired state 306. This may happen, for instance, when current security policies have expired and new ones must be obtained. This may also happen if the attestation client believes itself to be in an unsafe environment and needs to take remedial action. While in the impaired state 306, the attestation client responds unfavorably to requests to use the credential of health to authenticate by voluntarily refusing to use its private cryptographic key. A remediation event 316 can restore the attestation client back to the healthy state 304. Notably, even if the attestation client becomes compromised, such that the attestation client cannot be trusted to voluntarily refuse to authenticate, the expiration built into the credential of health (which can be a relatively short period of time) causes the attestation client to lose its credential of health (and its ability to authenticate) within a well-defined limited time, unless it continues to be trusted by renewing it credential of health (e.g. via a renewal event 312).

Furthermore, any number of felony events 318 or 320 can cause the attestation client to leave the healthy state 304 or the impaired state 306 and enter a failed state 308. Felony events 318 or 320 are events in which the attestation client believes it has fallen "out of policy," and are events from which the attestation client cannot recover without a restart and a re-attestation. When a felony event 318 or 320 occurs, the attestation client completely relinquishes access to its private cryptographic key, thereby eliminating the attestation client's ability to authenticate or attest to its health using the credential of health. Relinquishing access to the private cryptographic key can include, for example, irreversibly relinquishing access to a trusted hardware component (e.g. a TPM) storing the private cryptographic key. Furthermore, when a felony event 318 or 320 occurs the attestation client writes an event to the attestation log which causes any future requests to an attestation service for a credential of health to fail. Felony event 318 or 320 can include, for example, expiration of the credential of health, detecting an infection, detection of suspicious administrative actions, accidental or intentional misconfiguration, or expiration of current security policies.

Figure 4:
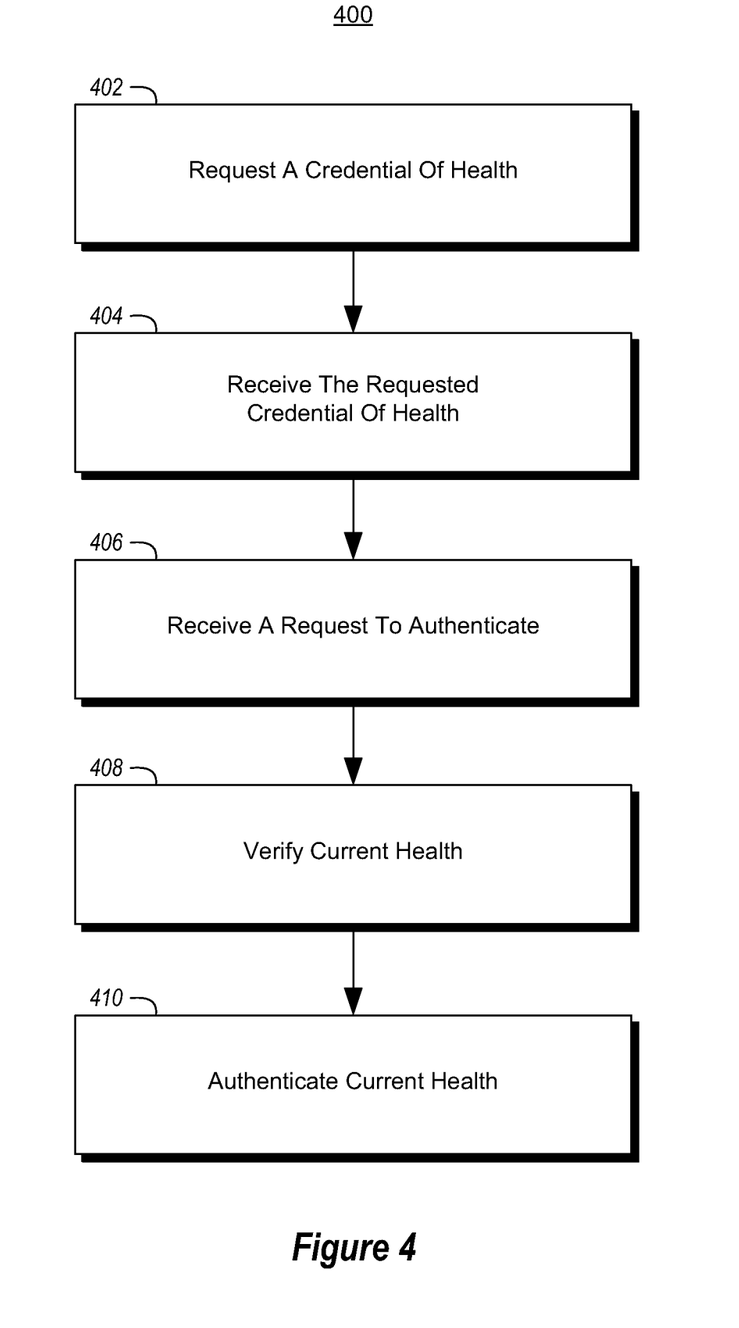
FIG. 4 illustrates a flowchart of a method for a self-regulating attestation client to use a certificate of health from an attestation service to authenticate that the self-regulating attestation client is currently healthy upon request.
Figure 5:
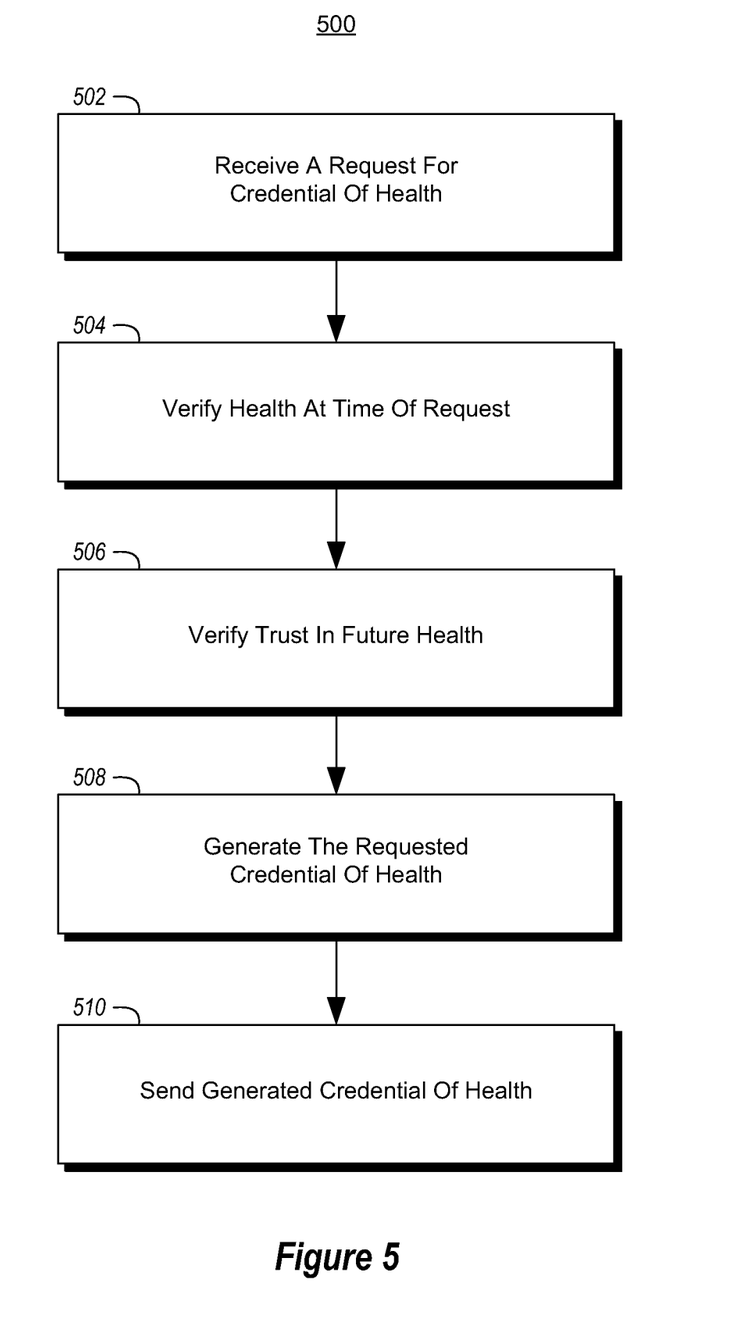
FIG. 5 illustrates a flowchart of a method for generating a credential of health for a self-regulating attestation client.

FIG. 4 illustrates a flowchart, from the perspective of an attestation client, of a method 400 for using a certificate of health from an attestation service to authenticate that a self-regulating attestation client is currently healthy upon request. FIG. 5 illustrates a flowchart, from the perspective of an attestation service, of a method 500 for generating a credential of health for a self-regulating attestation client. While the methods 400 and 500 may be performed in any environment that includes an attestation client and an attestation service, the methods 400 and 500 will be described with respect to the attestation system 200 of FIG. 2 and the state diagram 300 of FIG. 3.

FIG. 4 illustrates that, from the perspective of the attestation client, the method 400 can comprise an act 402 of requesting a credential of health. Act 402 includes an attestation client requesting a credential of health from an attestation service, the request comprising an ordered attestation log as well as a proof of integrity and freshness of the ordered attestation log. For example, attestation client 202 can request a credential of health from attestation service 204. The request can be a single request or part of a handshake operation, and attestation client 202 can provide attestation service 204 with an ordered attestation log that includes an ordered log of components (e.g., boot-time components) that were loaded at the computing system when the computing system made the request, along with a configuration of the components. The log can also include the identity of one or more monitoring agents running at attestation client 202 and information regarding one or more security policies being enforced at attestation client 202. In some instances, the ordered attestation log may be a Trusted Computing Group (TCG) log. Attestation client 202 can also provide attestation service 204 with proof of integrity and freshness of the ordered attestation log.

Turning for a time to FIG. 5, FIG. 5 illustrates that, from the perspective of the attestation service, the method 500 can comprise an act 502 of receiving a request for a credential of health. Act 502 includes the attestation service receiving a request from a self-regulating attestation client for a credential of health, the request comprising an ordered attestation log as well as a proof of integrity and freshness of the ordered attestation log. For example, attestation service 204 can receive the request for a credential of health from attestation client 202. The request can include an ordered attestation log and proof of proof of integrity and freshness of the ordered attestation log, as described with respect to act 402.

FIG. 5 also illustrates that the method 500 can comprise an act 504 of verifying health at the time of the request and an act 506 of verifying trust in future health. Act 504 includes verifying that the self-regulating attestation client was healthy when the client requested the credential of health, based on the ordered attestation log and the proof of integrity and freshness of the ordered attestation log, and act 506 includes verifying that the self-regulating attestation client is trusted to be healthy each time the client authenticates using the credential of health. For example, act 504 and/or act 506 can include attestation service 204 validating that the received attestation log is valid based on the received proof of integrity and freshness, and processing the entire attestation log. As discussed previously, this can include protecting against replay attacks by exchanging a cryptographic nonce and verifying the freshness of the attestation log. Furthermore, act 504 can include attestation service 204 verifying one or more components loaded at attestation client 202 when attestation client 202 sent the request comprises a healthy state, based on the attestation log. This can include, for example, verifying that any boot-time components loaded as part of a monitored or managed boot leave attestation client 202 in a healthy state.

Act 506 can include attestation service 204 verifying that one or more monitoring agents are loaded at attestation client 202 and that these monitoring agents are trusted by attestation service 204 to enforce one or more security policies at attestation client 202. Thus, attestation client 202 is trusted to defend itself to maintain a healthy state and to use the any granted credential of health to authenticate that is it currently healthy only when attestation client 202 is in a healthy state. Thus, attestation client 202 is trusted to discard or cease using any granted credential of health if it cannot guarantee its health.

As illustrated, the method 500 can also comprise an act 508 of generating the requested credential of health. Act 508 includes generating the credential of health, the generated credential of health uniquely identifying the self-regulating attestation client and certifying both that the self-regulating attestation client was healthy when the self-regulating attestation client requested the credential of health and also that the attestation service trusts the self-regulating attestation client to be healthy each time the self-regulating attestation client authenticates using the credential of health. For example, attestation service 204 can generate a credential of health for attestation client 202 which includes these certifications and which expires after a certain period of time. The generated credential of health can then be used by attestation client 202, during the period of validity, to authenticate to relying parties (e.g. relying party 206) that is healthy. Relying parties can rely on this authentication because attestation service 204 has certified that it trusts attestation client 202 to be healthy each time is authenticates using the credential of health. After expiration, the credential of health becomes invalid, and attestation client 202 must to re-attest and obtain a new credential of health in order to continue authenticating with relying parties.

The credential of health can, in some instances, comprise a cryptographic digital certificate or token. The certificate or token can be signed with a public cryptographic key received from attestation client 202. In this way, the generated credential of health uniquely identifies attestation client 202 and can only be used by attestation client 202 in connection with a private cryptographic key possessed by attestation client 202. The public cryptographic key and the private cryptographic key may have been previously generated by attestation client 202 (e.g. by a TPM). The public cryptographic key may have been previously sent to attestation service 206, or may have been sent to attestation service 206 as part of the request for a credential of health.

As shown in FIG. 5, the method 500 can also comprise an act 510 of sending the generated credential of health. Act 510 includes sending the generated credential of health to the self-regulating attestation client. For example, attestation service 204 can send the generated credential of health to attestation client 202.

Returning to FIG. 4, FIG. 4 illustrates that the method 400 can comprise an act 404 of receiving the requested credential of health. Act 404 can include receiving the credential of health from the attestation service, the credential of health uniquely identifying the attestation client and certifying both that the client was healthy when the client requested the credential of health and also that the attestation service trusts the client to be healthy each time the client authenticates using the credential of health. For example, attestation client 202 can receive the credential of health generated by attestation service 204 in act 508. The credential of health can certify that one or more components that were loaded at attestation client 202 when the request was made comprises a healthy state, and that monitoring agents at attestation client 202 are trusted by attestation service 204 to enforce certain security policies that ensure that attestation client 202 only uses the credential of health in the manner discussed previously.

FIG. 4 also illustrates that the method 400 can comprise and act 406 of receiving a request to authenticate. Act 406 includes the attestation client receiving a request to use the credential of health to authenticate that it is currently healthy. For example, attestation client 202 can receive a request from relying party 206 to authenticate that it is healthy using the credential of health. As noted, relying party 206 may also be attestation service 204, or may even be part of attestation client 202. Thus, relying party 206 is not limited to being a separate entity.

FIG. 4 further illustrates that the method 400 can comprise and act 408 of verifying current health. Act 408 includes the attestation client verifying that it is currently healthy. For example, attestation client 202 can conclude this it is presently in healthy state 304. This can include, for instance, attestation client 202 concluding that that it has not violated any security policies that would remove it from healthy state 304. Additionally or alternatively, attestation client 202 may conclude that is has access to the private cryptographic key necessary to perform the authentication. Additionally or alternatively still, attestation client 202 may conclude that one or more monitoring agents are running and report a healthy state.

Of course, attestation client 202 may also conclude that it is not in healthy state 304. For example, attestation client 202 may conclude that it is in impaired state 306 as a result of a misdemeanor event 314 occurring. In this instance, attestation client 202 voluntarily refuses to authenticate that it is currently healthy. Later, attestation client 202 may determine that a remediation event 314 has occurred and restore itself to healthy state 304.

Furthermore, attestation client 202 may conclude that it is in failed state 308 as a result of a felony event 318 or 320 occurring. In this circumstance, attestation client 202 would have relinquished access to the private cryptographic key that is necessary to authenticate using the credential of health when it entered failed state 308, thereby rendering attestation client 202 unable to authenticate. Attestation client may relinquish access to a trusted hardware component in any appropriate manner, such as relinquishing access to a TPM storing the private cryptographic key. Furthermore attestation client 202 writes an event to the ordered attestation log which causes any future requests for a credential of health to fail.

After a successful verification in act 408, FIG. 4 illustrates that method 400 can comprise an act 410 of authenticating current health. Act 410 includes the attestation client using the credential of health to authenticate that it currently healthy. For example, attestation client 202 can use the private cryptographic key in connection with the credential of health to perform the authentication. Relying party 206 can rely on this authentication and trust that attestation client 202 is currently healthy because attestation service 204 has certified that it trusts attestation client 202 to be healthy each time is authenticates using the credential of health. Of course, one will recognize that in an alternative case in which verification of current health failed, attestation client 202 would either voluntarily refuse to authenticate (i.e., when in impaired state 306) or be unable to authenticate (i.e., when in failed state 308).

Accordingly, an effective mechanism for a self-regulating attestation client, or subject of attestation, is disclosed. The mechanism solves several problems existing in current attestation scenarios, including reliably providing current and future attestation of an attestation client's health, the alleviation of problems surrounding an unbounded attestation log, and the inefficiencies surrounding an attestation client that cannot perform at least some measure of self-attestation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented within a self-regulating attestation client computing system and that includes one or more processors and memory storing instructions which, when executed by the one or more processors, implement the method for using a certificate of health from an attestation service to authenticate that the self-regulating attestation client computing system is currently healthy upon request, the method comprising the acts of: the computing system of the attestation client requesting a credential of health from an attestation service, the credential of health from the attestation service comprising a digital certificate or token that is signed by a public cryptographic key provided by the computing system, the request comprising an ordered attestation log as well as a proof of integrity and freshness of the ordered attestation log, the proof of integrity and freshness being implemented by the attestation service to verify the integrity and freshness of the log itself; the computing system receiving the credential of health from the attestation service, the credential of health uniquely identifying the computing system and certifying that the computing system was healthy when the computing system requested the credential of health and that the attestation service trusts the computing system to be healthy each time the computing system authenticates using the credential of health, such that the credential of health is only sent to and received by the computing system in response to the attestation service having verified the past health attestation of the computing system and, upon verifying the past health attestation of the computing system, the ability for the computing system to verify that the computing system will only use the credential of health when the computing system is currently in a healthy state and when the credential of health is not expired; the computing system receiving a request to use the credential of health to authenticate that it is currently healthy; the computing system verifying that it is currently healthy; and the computing system using the credential of health to authenticate that it currently healthy.

2. The method in accordance with claim 1, wherein certifying that the computing system was healthy when the computing system requested the credential of health comprises: certifying that one or more components that were loaded at the computing system when the computing system made the request comprises a healthy state.

3. The method in accordance with claim 2, wherein certifying that the attestation service trusts the computing system to be healthy each time the computing system authenticates using the credential of health comprises: certifying that the computing system includes one or more monitoring agents that are trusted by the attestation service to enforce one or more security policies, such that the computing system is trusted to defend itself to maintain a healthy state and such that the computing system is trusted to use the credential of health to authenticate that is it currently healthy only when the computing system is in a healthy state.

4. The method in accordance with claim 3, wherein the ordered attestation log includes: an ordered log of all of the one or more components that were loaded at the computing system when the computing system made the request, along with a configuration of the components; an identity of the one or more monitoring agents; and information regarding the one or more security policies.

5. The method in accordance with claim 3, wherein the computing system refuses to use the credential of health to authenticate that is it currently healthy either by voluntarily refusing to authenticate or by irrevocably yielding access to a private cryptographic key necessary for authentication.

6. The method m accordance with claim 1, further comprising: the computing system generating the public cryptographic key and a private cryptographic key; and the computing system sending the public cryptographic key to the attestation service.

7. The method in accordance with claim 6, wherein the credential of health uniquely identifying the computing system comprises the credential of health including or being based on the public cryptographic key; and wherein the computing system using the credential of health to authenticate that it currently healthy comprises the computing system using the private cryptographic key in connection with the credential of health to perform the authentication.

8. The method in accordance with claim 1, wherein the computing system verifying that it is currently healthy comprises one or more of: the computing system verifying that it has not violated the one or more security policies, the computing system verifying whether it has access to a private cryptographic key necessary to perform the authentication, or the computing system verifying that one or more monitoring agents are running and report a healthy state.

9. The method in accordance with claim 1, further comprising: the computing system determining that a misdemeanor event has occurred; the computing system temporarily leaving a healthy state and entering an impaired state; the computing system receiving a different request to authenticate that it is currently healthy; and the computing system voluntarily refusing to authenticate that it is currently healthy as a result of being in the impaired state.

10. The method in accordance with claim 9, further comprising: the computing system determining that a remediation event has occurred; and the computing system to leaving the impaired state and entering the healthy state.

11. The method in accordance with claim 1, further comprising: the computing system determining that a felony event has occurred; the computing system permanently leaving a healthy state or an impaired state and entering a failed state; the computing system relinquishing access to a private key that is necessary to authenticate using the credential of health, such that the computing system is no longer able to authenticate; and the computing system writing an event to the ordered attestation log which causes any future requests for a credential of health to fail.

12. The method in accordance with claim 1, wherein the ordered attestation comprises a Trusted Computing Group (TCG) log.

13. A method implemented within a computing system that includes one or more processors and memory storing instructions which, when executed by the one or more processors, implement the method for generating a credential of health for a self-regulating attestation client, the method comprising the acts of: the computing system receiving a request from a self-regulating attestation client for a credential of health, the credential of health from the attestation service comprising a digital certificate or token that is signed by a public cryptographic key provided by the computing system, the request comprising an ordered attestation log as well as a proof of integrity and freshness of the ordered attestation log, the proof of integrity and freshness being implemented by the attestation service to verify the integrity and freshness of the log itself; the computing system verifying that the self-regulating attestation client was healthy when the self-regulating attestation client requested the credential of health, based on the ordered attestation log and the proof of integrity and freshness of the ordered attestation log; the computing system verifying that the self-regulating attestation client is trusted to be healthy, each time the self-regulating attestation client authenticates using the credential of health, based on the ordered attestation log having information that verifies that the computing system is a self-regulating client that actively defends itself against malware and other untrusted code and verifies that the computing system will only use the credential of health when the computing system is currently in a healthy state and when the credential of health is not expired, and based on the proof of integrity and freshness of the ordered attestation log; the computing system generating the credential of health, the generated credential of health uniquely identifying the self-regulating attestation client and certifying both that the self-regulating attestation client was healthy when the self-regulating attestation client requested the credential of health and also that the attestation service trusts the self-regulating attestation client to be healthy each time in the future that the self-regulating attestation client authenticates using the credential of health; and the computing system sending the generated credential of health to the self-regulating attestation client.

14. The method in accordance with claim 13, wherein verifying that the self-regulating attestation client was healthy when the self-regulating attestation client requested the credential of health comprises: certifying that one or more components that were loaded at the self-regulating attestation client when the self-regulating attestation client made the request comprises a healthy state.

15. The method in accordance with claim 13, wherein verifying that the self-regulating attestation client is trusted to be healthy each time the self-regulating attestation client authenticates using the credential of health comprises: certifying that the self-regulating attestation client includes one or more monitoring agents that are busted by the attestation service to enforce one or more security policies, such that the self-regulating attestation client is busted to defend itself to maintain a healthy state and such that the self-regulating attestation client is trusted to use the credential of health to authenticate that is it currently healthy only when the self-regulating attestation client is in a healthy state.

16. The method in accordance with claim 15, wherein the ordered attestation log includes: an ordered log of all of the one or more components that were loaded at the self-regulating attestation client when the self-regulating attestation client made the request, along with a configuration of the components; an identity of the one or more monitoring agents; and information regarding the one or more security policies.

17. The method in accordance with claim 13, further comprising: receiving a public cryptographic key from the self-regulating attestation client that uniquely identifies the self-regulating attestation client; and including or basing the credential of health on the public cryptographic key so that the generated credential of health uniquely identifies the self-regulating attestation client.

18. The method in accordance with claim 13, wherein the generated credential of health comprises a cryptographic digital certificate or token.

19. The method in accordance with claim 13, wherein at least one of the acts of verifying comprises: validating that the ordered attestation log is valid based on the proof of integrity and freshness; and processing the entire ordered attestation log.

20. A hardware storage device having stored thereon computing executable instructions that, when executed by one or more processors of a self-regulating attestation client computing system, implement a method for the computing system performing a self-regulated attestation of health, the method comprising the acts of: performing a measured boot of the computing system by loading one or more trusted boot-time components while recording information about the busted boot-time components in an ordered attestation log; loading one or more trusted internal monitoring agents that enforce one or more security policies at the computing system and that protect the integrity of the computing system through enforcement of the security policies, while recording information about the identity of the trusted internal monitoring agents and the security policies in the ordered attestation log; generating a public cryptographic key and a private cryptographic key unique to the computing system and sending the public cryptographic key to an attestation service; sending a request for a credential of health to the attestation service, the credential of health from the attestation service comprising a digital certificate or token that is signed by the public cryptographic key provided by the computing system, the request including the ordered attestation log and proof of integrity and freshness of the ordered attestation log, the proof of integrity and freshness being implemented by the attestation service to verify the integrity and freshness of the log itself; receiving the credential of health from the attestation service, the credential of health indicating that the attestation service trusts the integrity of the measured boot of the computing system, that the attestation service trusts the computing system to defend itself to maintain a healthy state using the internal monitoring agents and the security policies, and that the attestation service trusts the computing system to use the credential of health to authenticate that is it currently healthy only when the computing system is in a healthy state, such that the credential of health is only sent to and received by the computing system in response to the attestation service having verified the past health attestation of the computing system and, upon verifying the past health attestation of the computing system, the ability for the computing system to verify that the computing system will only use the credential of health when the computing system is currently in a healthy state and when the credential of health is not expired; receiving a request to verify the health of the computing system; verifying that the computing system is currently healthy based on at least whether the computing system has violated any of the security policies; and using the credential of health and the private cryptographic key to authenticate that the computing system is currently healthy.

21. The hardware storage device of claim 20, wherein the method further includes relinquishing access to the credential of health in response to detecting a security condition and thereafter requiring a reboot and re-attestation upon relinquishing access to the credential of health prior to using the credential of health again.

22. The hardware storage device of claim 20, wherein the method fullher includes distinguishing between felony events and misdemeanor events, wherein the misdemeanor events cause the attestation client computing system to be only temporarily removed from a healthy state without requiring a reboot and/or re-attestation and wherein the felony events cause the attestation client computing system to be removed from the healthy state until the attestation client computing system is first restarted and performs re-attestation.

* * * * *